United States Patent [19]
MacDonald

[11] Patent Number: 6,079,702
[45] Date of Patent: Jun. 27, 2000

[54] CHAIN SAW MINI-WORKBENCH

[76] Inventor: Kenneth Lockie MacDonald, Box 62, Miramichi, New Brunswick, Canada, E1N 3A5

[21] Appl. No.: 09/268,328

[22] Filed: Mar. 16, 1999

[51] Int. Cl.[7] .................................................. B23Q 3/02
[52] U.S. Cl. .............................................. 269/55; 269/102
[58] Field of Search ............................ 269/55, 102, 303, 269/305

[56] References Cited

U.S. PATENT DOCUMENTS

| | | | |
|---|---|---|---|
| 954,148 | 4/1910 | Swain . | |
| 2,437,779 | 3/1948 | Carpenter | 269/102 |
| 3,625,504 | 12/1971 | Walker | 269/55 |
| 4,109,900 | 8/1978 | Vandecoevering | 269/102 |
| 4,248,412 | 2/1981 | DeRoy | 269/102 |
| 4,727,777 | 3/1988 | Obester | 76/78 A |
| 4,813,843 | 3/1989 | Gilmour et al. | 269/55 |
| 4,949,446 | 8/1990 | Kuwica | 269/102 |
| 5,816,118 | 10/1998 | Favinger | 76/80.5 |

*Primary Examiner*—David A. Scherbel
*Assistant Examiner*—Daniel Shanley
*Attorney, Agent, or Firm*—Mario D. Theriault

[57] ABSTRACT

A mini-workbench made of a flat bar having a top surface and a bottom surface, a planar tab extending from said bottom surface and a tridental clamp mounted to the top surface for clamping the bar of a chain saw. The planar tab is insertable in a slot cut in a tree stump for retaining the flat bar to the tree stump. The tridental clamp is usable for retaining the saw bar to the flat bar, whereby the chain saw may be filed with ease, firmness and precision. In one aspect of the invention, the thickness of the planar tab is similar to a common chain saw kerf. A woodcutter may use his/her power saw for slotting the upper end of a tree stump having a proper height and location, and easily mount the mini-workbench to that stump.

20 Claims, 6 Drawing Sheets

CHAIN SAW MINI-WORKBENCH

FIELD OF THE INVENTION

The present invention relates to portable supports for steadying a chain saw in the forest, for the purpose of filing, adjusting and servicing the chain saw. More particularly, the present invention relates to a support device having means for attachment to a tree stump and to the bar of a chain saw for steadying the chain saw in a maintainable position.

BACKGROUND OF THE INVENTION

The performance of woodcutters depends to a great extent, to the condition of their power saws. Therefore, chain saw operators generally sharpen their saw three or four times per day, or more often. Those who are familiar with this art will appreciate that it is at times difficult to sharpen a chain saw while kneeled down to the ground near a chain saw that is loosely laid on an uneven surface. The filing of the chain teeth in these cases is not always effected at the proper angle to give the teeth ideal kerf and pitch. Furthermore, the filling of the chain saw's reservoirs of fuel and chain lubricant when the chain saw is supported loosely, is prone to cause an operator to inadvertently spill gasoline and lubrication oils in the environment. These reasons basically have contributed to the development of a market demand for support devices capable of steadying a chain saw in the forest and allowing an operator to properly file and service the saw.

A number of power saw supporting devices have been developed in the past, and have been used with varying degrees of success. In that respect, a first example of a chain saw vise is illustrated in U.S. Pat. No. 4,109,900 issued on Aug. 29, 1978 to K. E. Vandecoevering. This chain saw vise has a clamp with jaw plates that are operable by wing nuts for attachment to the bar of a chain saw. There is also provided an anvil plate from which a threaded spike extends. In use, the spike is hammered down through the top surface of a stump for retaining the vise to the stump.

Another example of a chain saw vise of the prior art is illustrated in U.S. Pat. No. 4,248,412 issued on Feb. 3, 1981 to L. DeRoy. This invention consists of an L-shaped member equipped with a vise for clamping the bar of a chain saw. A lag screw extend through one arm of the L-shaped member and is adapted to be driven into the top surface of a stump for retaining the device to the stump. The L-shaped member further comprises an adjustable saddle member for supporting the handle bar of a chain saw that is oriented upside down.

Another type of chain saw support device is illustrated in U.S. Pat. No. 4,727,777 issued on Mar. 1, 1988 to J. Obester. In this installation the support device is pivoted on a post which is affixed to the fender of a pickup truck. The support device is conveniently movable from a stowed position along the fender of the pickup truck to an usable position extending away from the pickup truck.

A more recent invention in the field of chain-saw-support devices is described in U.S. Pat. No. 5,816,118 issued on Oct. 6, 1998 to A. Favinger. In this invention, a slotted block and a strap are used for securing a chain saw to a bench. The weight of a person using the bench keeps the bench and the saw from moving during the filing of the saw.

It is believed that aside from retail price and portability, a first requirement by the forestry industry regarding chain saw support devices is that it must contain few moving parts that could become lose and lost. A second preferred requirement by the forestry industry is believed to be that the support device must be capable of supporting a chain saw in such a way that the saw bar may be easily adjusted. Another preferred requirement related to chain saw support devices is that the fuel and chain-oil reservoirs of the saw may be refillable while the saw is still secured to the device following the filing of the chain.

The chain saw support devices of the prior art are believed to be deficient at least one of the above preferred requirements, and it is this reason basically that has contributed to the development of a market demand for a better a chain saw support device capable of satisfying all the preferred requirements of the woodcutting industry.

SUMMARY OF THE INVENTION

In the present invention, however, there is provided a mini-workbench for supporting a chain saw to the stump of a tree. In one embodiment of the invention, the workbench has few parts and is relatively light and compact in size for convenient carrying with other woodcutter tools and supplies.

Broadly, in accordance with one feature of the invention, the workbench comprises a flat bar having a top surface, a bottom surface, a planar tab extending from the bottom surface, and a trident-like clamp mounted to the top surface for clamping the bar of a chain saw.

A primary advantage of the workbench of the present invention is that the planar tab is insertable in a slot cut in a tree stump for retaining the flat bar to the tree stump. The tridental clamp is usable for retaining the saw bar to the flat bar, whereby the chain saw may be filed with ease, firmness and precision.

In accordance with another feature of the present invention, the thickness of the planar tab of the mini-workbench is similar to a common chain saw kerf. A wood cutter may use his/her power saw for slotting the upper end of a stump having a proper height and location, and easily install the mini-workbench to that stump.

In a further aspect of the present invention, there is provided an articulate workbench for supporting a chain saw to a tree stump in such a manner that the chain saw may be tilted on its side. The workbench comprises a first flat bar having a first top surface and a first bottom surface, and a second flat bar having a second top surface and a second bottom surface. A hinge is connected to first and second flat bars and movably joining the first bottom surface to the second top surface for relative angular movement between the first and second flat bars. A planar tab extends from the second bottom surface. There is also provided a trident-like clamp mounted to the first top surface for clamping a chain saw bar.

In this aspect of the present invention, the planar tab is insertable in a slot cut in a tree stump for retaining the second flat bar to the tree stump. The tridental clamp is usable for retaining a chain saw bar to the first flat bar, and the first flat bar is angularly movable relative to the second flat bar for tilting the chain saw engine on its side. When the chain saw engine is tilted on its side, the reservoirs thereof are easily refillable with fuel and lubricant, without fear of spilling hydrocarbons over the forest floor.

In yet another feature of the present invention, there is provided a planar rib connected to the planar tab and making substantially a right angle with both the planar tab and the second bottom surface. The rib and the tab have a common thickness which is similar to the kerf of a chain saw. The rib and the tab are usable for insertion in cross-like slots made with a chain saw on the upper end of a tree stump. When the rib and tab are properly inserted in the cross-like slots, the mini-workbench is effectively retainable to that tree stump even when the chain saw engine is tilted on its side.

Still another feature of the invention is that it is susceptible of a low cost of manufacture with regard to materials, equipment and labour, and which accordingly is then susceptible of low price of sale to the woodcutting industry, thereby making such mini-workbench economically available to the public.

BRIEF DESCRIPTION OF THE DRAWINGS

Two embodiments of this invention are illustrated in the accompanying drawings, in which like numerals denote like parts throughout the several views, and in which.

DETAILED DESCRIPTION OF THE PREFERRED EMBODIMENTS

While this invention is susceptible of embodiments in many various forms, there is shown in the drawings and will be described in details herein two specific embodiments, with the understanding that the present disclosure is to be considered as examples of the principles of the invention and is not intended to limit the invention to the embodiments illustrated.

Referring to FIGS. 1–9, the chain saw mini-workbench according to the first preferred embodiment 20 is illustrated therein. The mini-workbench according to the first preferred embodiment consists of a rigid flat bar 22 having three posts 24,26,28 mounted on one side thereof and a planar tab 30 extending from the other side.

The tab 30 has a thickness substantially similar to the kerf of a common chain saw such it is mountable in a cut effected by a power saw on the upper end of a tree stump. The mini-workbench is thereby retainable to that tree stump. In the first preferred embodiment, the planar tab 30 is extending at right angle with the bottom surface of the flat bar 22, and at right angle with the longitudinal axis of the flat bar 22.

Figure 1:
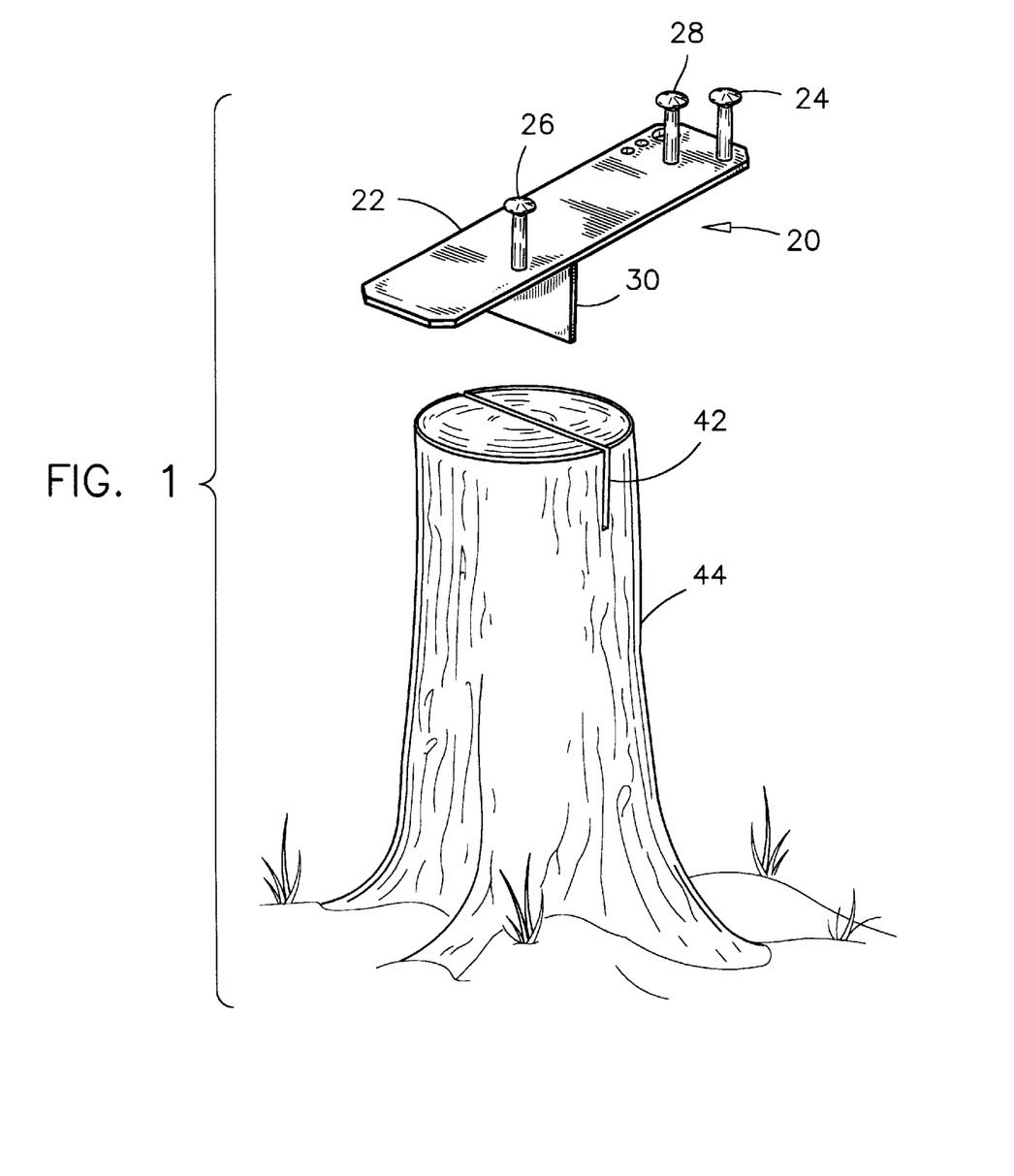
FIG. 1 is a perspective view of chain saw mini-workbench according to the first preferred embodiment of the present invention, and of a tree stump on which this mini-workbench is mountable.
Figure 2:
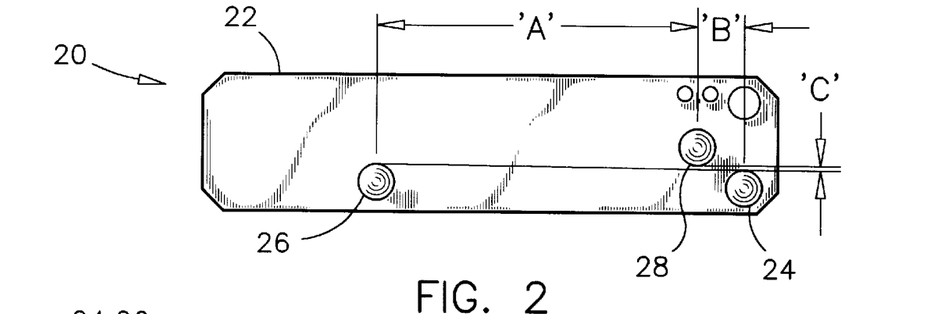
FIG. 2 is a top view of the mini-workbench according to the first preferred embodiment.
Figure 3:
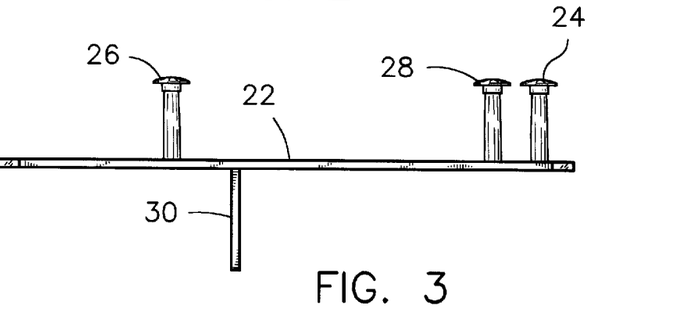
FIG. 3 is a side view of the mini-workbench according to the first preferred embodiment.
Figure 4:
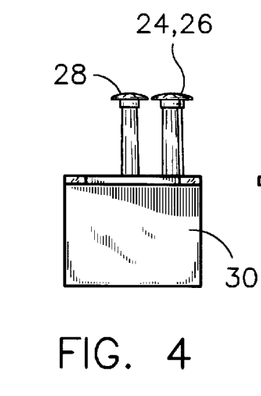
FIG. 4 is an end view of the mini-workbench according to the first preferred embodiment.
Figure 5:
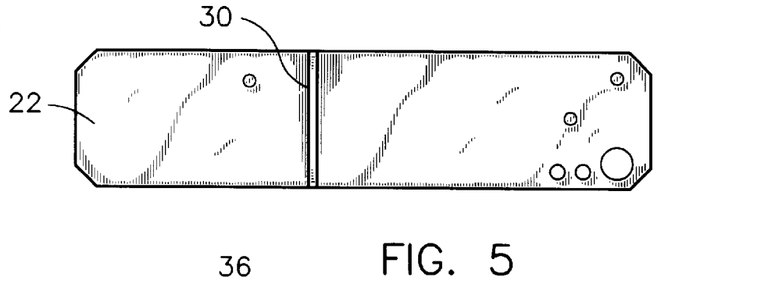
FIG. 5 is an underside view of the mini-work bench according to the first preferred embodiment.

The three posts comprise a forward post 24, a rear post 26, and an intermediate post 28. The forward and rear posts 24,26, are aligned with one another along one edge of the flat bar 22. The intermediate post 28 is placed between the forward and rear posts 24,26 near the forward post 24 and offset from the alignment of the forward and rear posts 24,26. The three posts 24,26,28 cooperatively define a trident arrangement capable of retaining a straight and resilient saw bar that is interlaced there between. This trident arrangement is referred to herein as a trident-like clamp, a trident-like clamping means, a tridental clamp or a tridental clamping means.

Figure 6:
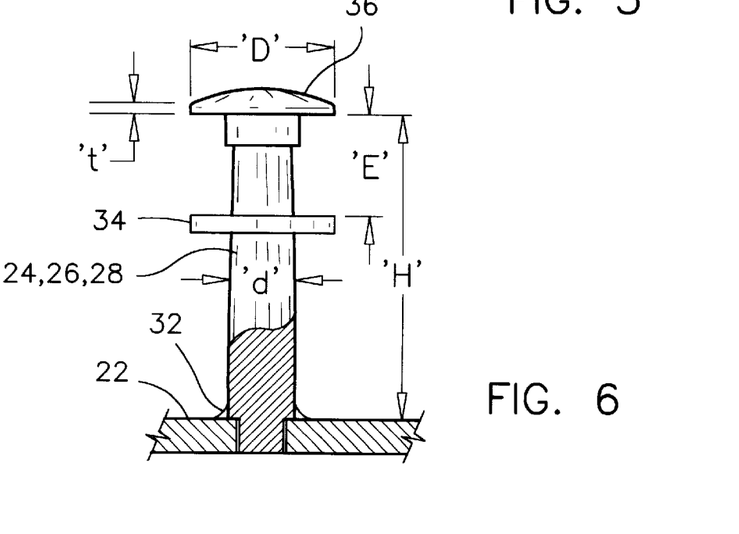
FIG. 6 is an enlarged side view of one of the posts extending from the flat bar of the mini-workbench according to one of the first or second preferred embodiments, and constituting one part of the trident-like clamping means.

When the mini-workbench is used to support a nominal 16 inches common saw bar, the spacing 'A' between the forward and rear posts 24,26 is about 12 inches. The preferred spacing 'B' between the forward post 24 and the intermediate posts 28 is about 1⅜ inches. The offset distance between the intermediate post 28 and the alignment of the forward and rear posts 24,26 is such that the transversal gap 'C' between the posts 24,26 and 28 is slightly less than the thickness of the saw bar to be retained. For example, when the posts have heads with an overall diameter 'D' of 1.0625 inches, the transversal gap 'C' is about ⅛ inch, for use with a chain saw bar that has a thickness of about 0.188 to 0.200 inch.

It will be appreciated that the spacing 'B' between the intermediate post 28 and the forward post 24, is not essential and can be otherwise. The triangular arrangement of the posts 24,26,28, however, is needed to constitute the tridental clamping means described herein. Similarly, the clamping gap 'C' between the base and the apex of the triangular formation is required to slightly flex the saw bar in order to retain it. The dimensions 'A' and 'B' are related especially to the leverage required to easily flex the saw bar for clamping the saw bar, when the power saw is held in ones hand in the usual manner.

Other preferred dimensions for the posts 24,26,28, comprise a total height 'H' from the flat bar 22 of about 2¾ inches, a shank diameter 'd' of about ½ inch, a head thickness 't' of about 0.070 inch, and a socket-type connection 32 to the flat bar 22. A round washer 34 may also be provided on one or more posts, at a distance 'E' of about ¾ inch below the post head 36. The diameter of the round washer 34 is a same diameter as the bolt head 36. Although the presence of a washer 34 on each post is not essential, this washer enlarges the retention surface of each bolt, and may be preferred by some users of the mini-workbench.

Figure 7:
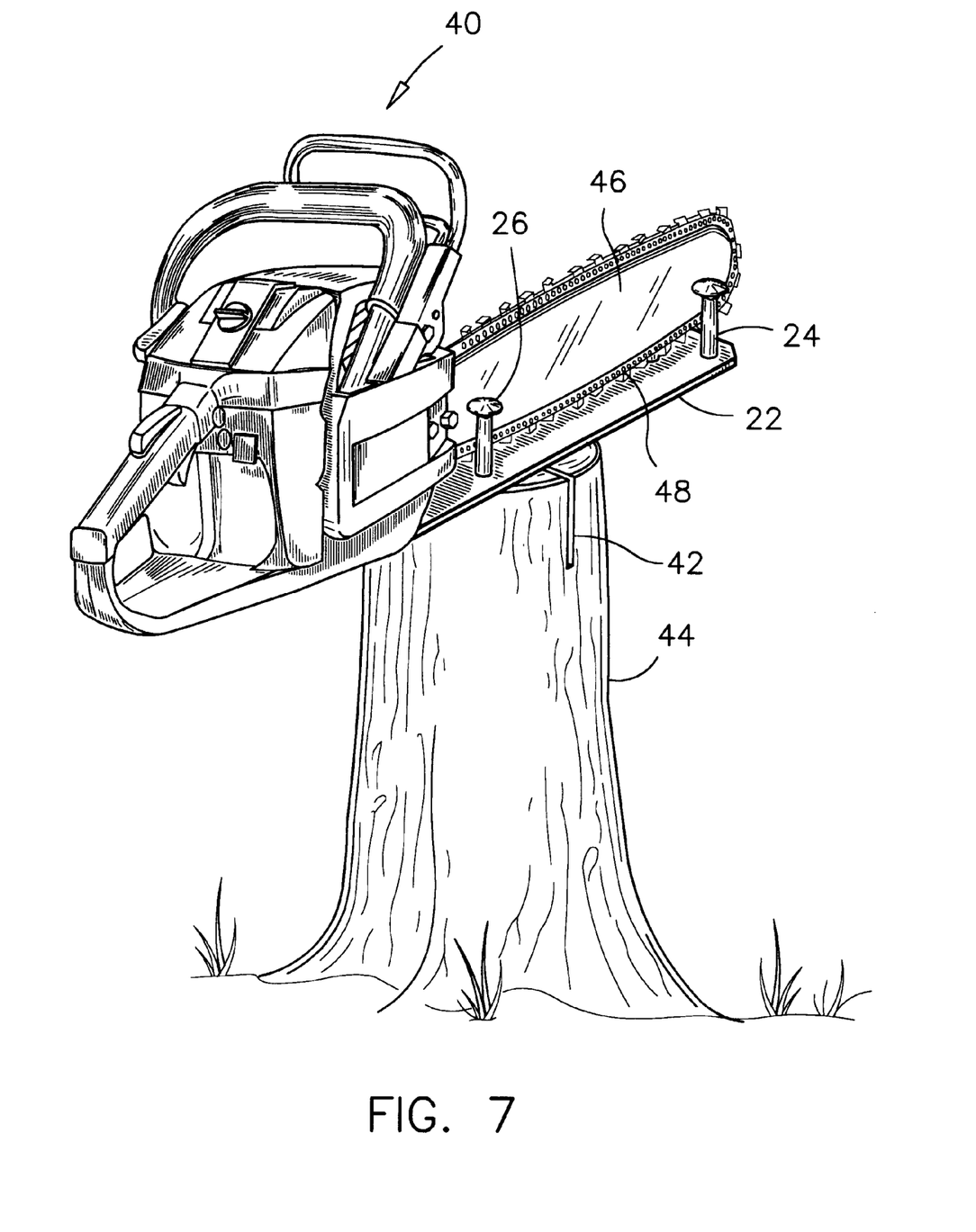
FIG. 7 is a perspective view of the mini-workbench according to the first preferred embodiment shown in a usable mode.
Figure 8:
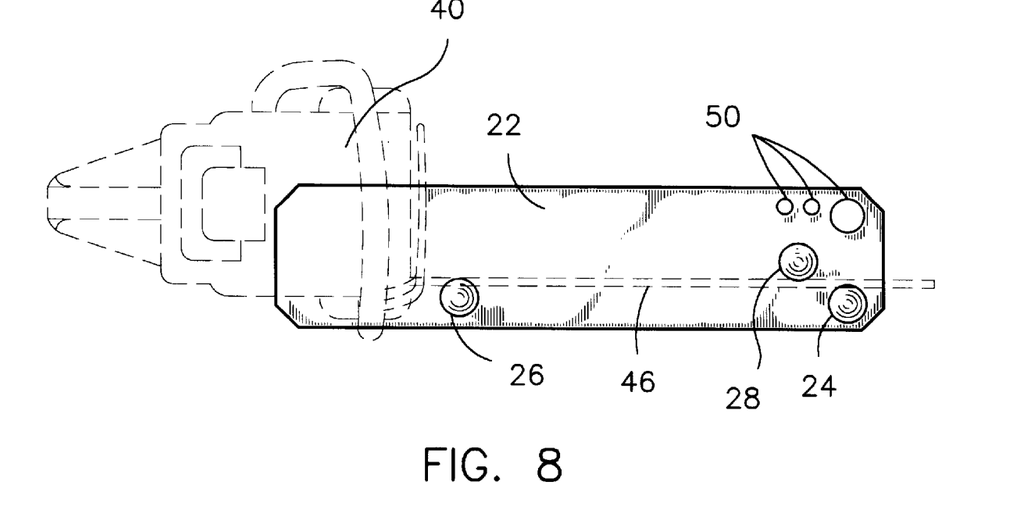
FIG. 8 is a top view of the mini-workbench according to the first preferred embodiment showing a top view of a power saw mounted thereon and shown in dash lines.
Figure 9:
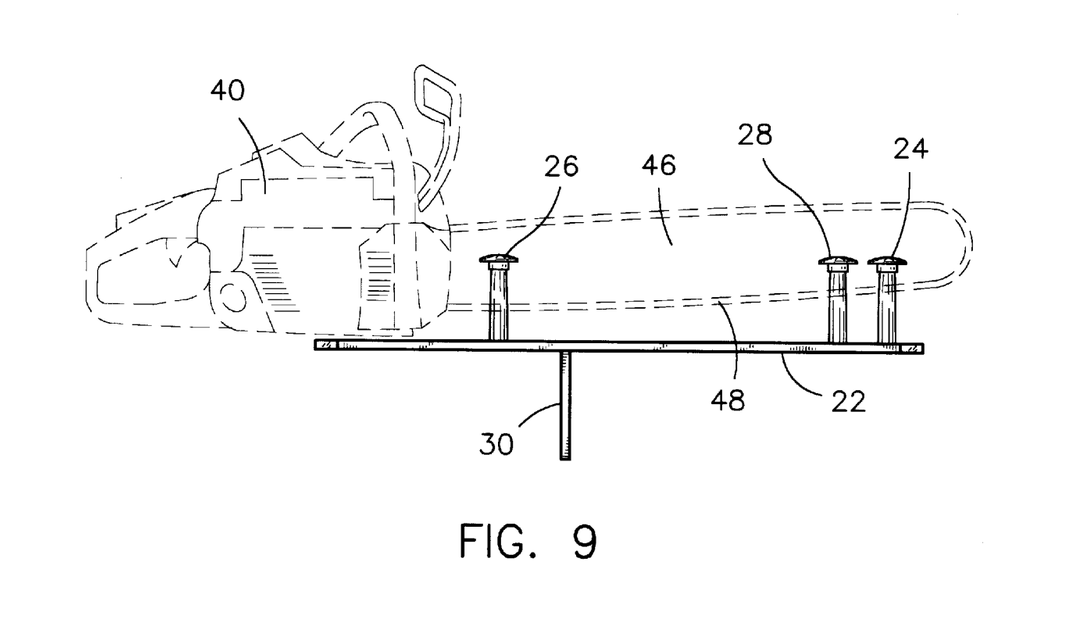
FIG. 9 is a side view of the mini-workbench according to the first preferred embodiment showing a side view of a chain saw mounted thereon and shown in dash line.

In use, the power saw 40 is used to make a cut 42 on the upper end of a tree stump 44. The tab 30 of the mini-workbench 20 is inserted in that slot 42. The chain saw bar 46 is placed between the forward and intermediate posts 24,28, and is pried sideways and engaged against the rear posts 26 as illustrated in FIGS. 7 and 8, with the chain saw engine supported on the rear end of the flat bar 22, and the chain 48 hanging above the surface of the flat bar 22, as shown in FIG. 9.

The resiliency of the bar 46 and the associated friction between the chain saw bar and the posts 24,26,28, causes the chain saw to be firmly held to the mini-workbench 20. The length of each post as mentioned above and the related location of the gap 'C' from the top surface of the flat bar, are advantageous for retaining a power saw with the saw bar and the chain thereof extending above the upper surface of the flat bar. The chain may then be filed entirely with ease, and the bar may be tightened while the power saw is retained to the mini-workbench.

Referring back to FIG. 8, there may also be provided in the flat bar 22, a series of holes 50, for retaining for example several files and a lubrication tube (not shown), such that a user thereof may conveniently set out his/her tools in an orderly manner.

Referring now to FIGS. 10–14, the chain saw mini-workbench according to the second preferred embodiment 60 is illustrated therein. The mini-workbench according to the second preferred embodiment has a flat bar 62 and three posts 64,66,68 that are similar in shape, dimensions, placement and purpose as in the mini-workbench according to the first preferred embodiment. This second model, however, has a hinged tab 70 for allowing the chain saw to be turned on its side for the purpose of filling the gasoline tank and the chain lubricant reservoir.

Figure 10:
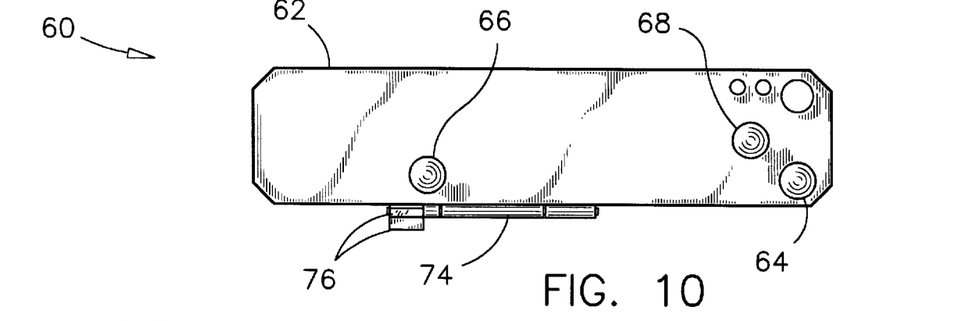
FIG. 10 is a top view of a chain saw mini-workbench according to the second preferred embodiment, shown in a folded mode.
Figure 11:
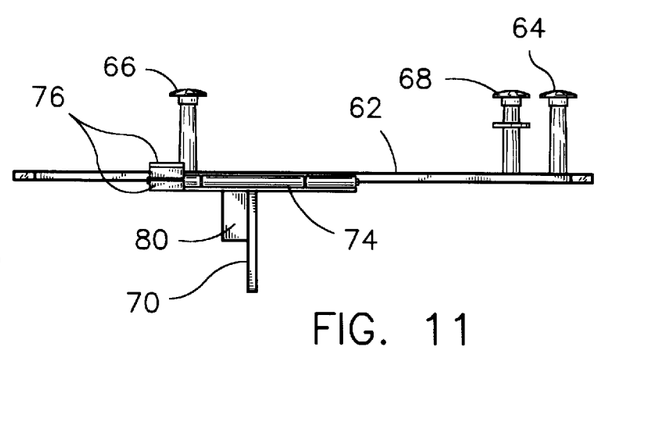
FIG. 11 is a side view of the chain saw mini-workbench according to the second preferred embodiment, shown in a folded mode.
Figure 12:
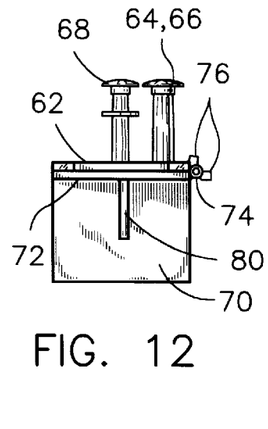
FIG. 12 is a first end view of the chain saw mini-workbench according to the second preferred embodiment, shown in a folded mode.

The tab 70 is connected to a hinged plate 72 which is connected to the flat bar 62 by a hinge 74. The hinge 74 has rotational stoppers 76 for preventing a rotation thereof beyond a range of about 90 degrees or less, such that a centre of gravity of the power saw retained thereon is outside the hinge relative to the flat bar, but remains as close as possible from the axis of the hinge. This angular limitation has been found to be advantageous for tilting the power saw sideways for easily filling both reservoirs of the saw.

Figure 13:
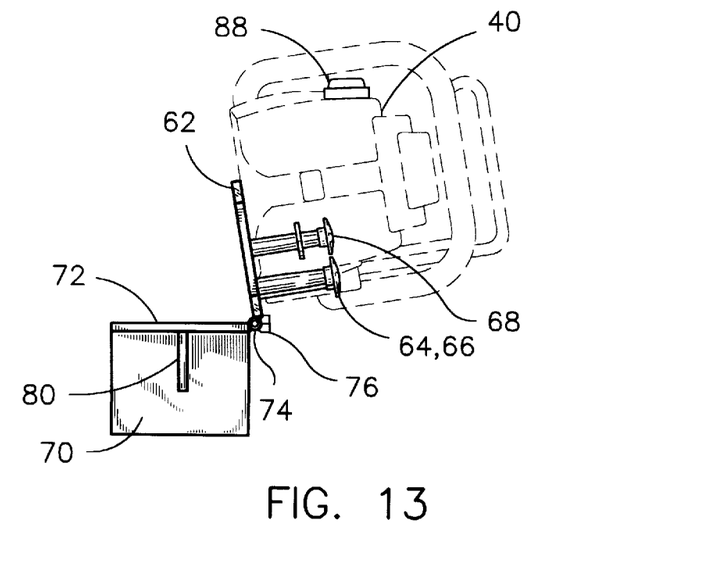
FIG. 13 is a second end view of the mini-workbench according to the second preferred embodiment, shown in a deployed mode with a chain saw mounted thereon, the chain saw being shown in dash lines.
Figure 14:
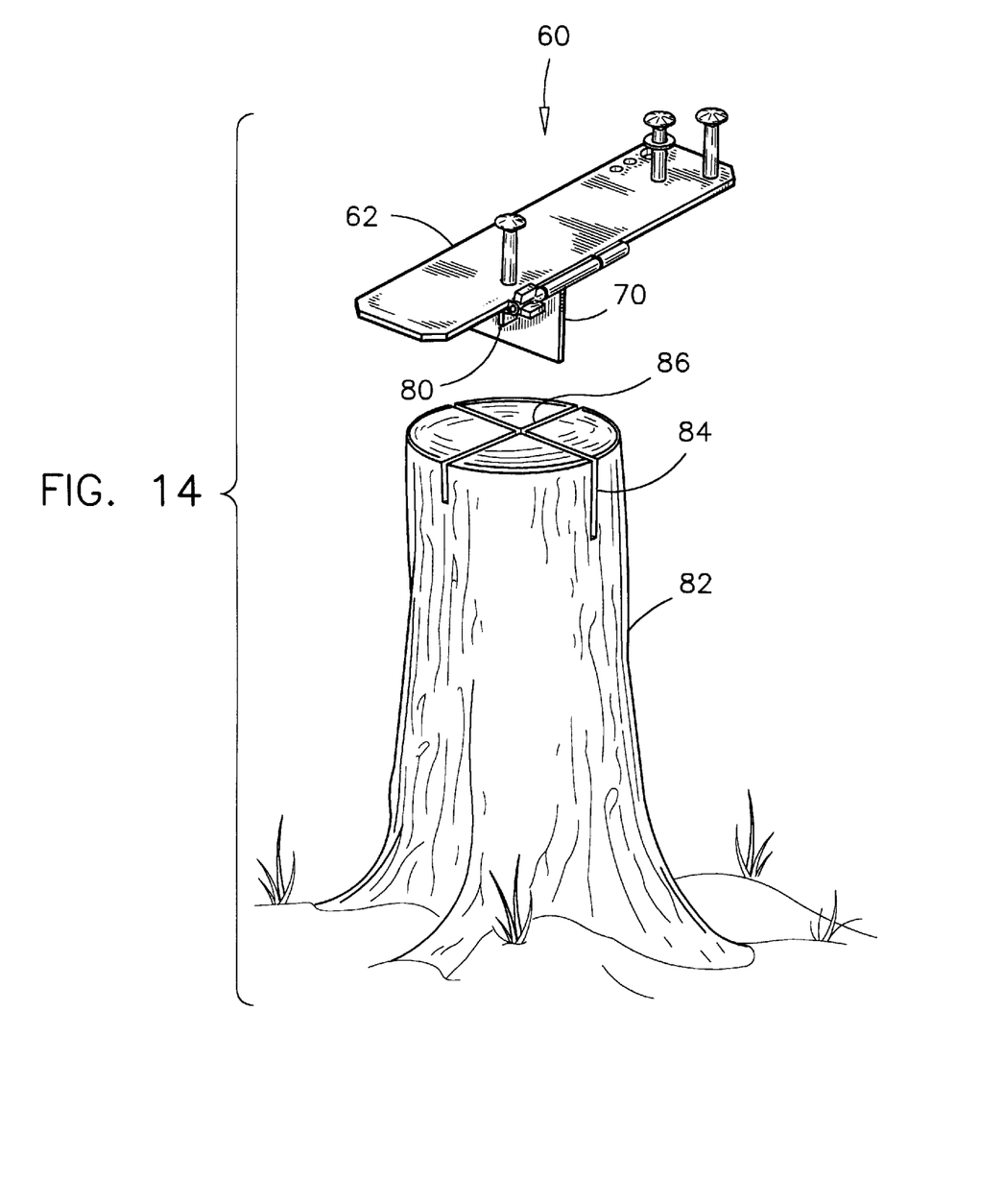
FIG. 14 is a perspective view of the mini-workbench according to the second preferred embodiment, shown being mounted to a tree stump.

There is also provided on the tab 70, a rib 80 extending at right angle from the tab. In use, the top surface of a tree stump 82 is cut in two directions 84,86 perpendicular to one another, to make cross-like cuts as illustrated in FIG. 14. The tab 70 and rib 80 are inserted in the cross-like cuts 84,86, such that the mini-workbench 60 is retainable to the tree stump 82 along transversal and longitudinal axes relative to the hinge 74. When a chain saw 40 is mounted on the mini-workbench according to the second preferred embodiment, as illustrated in FIG. 13, the engagement of the rib 80 in the cross-like cuts 84,86 prevents the hinged plate 72 and the tab 70 from moving out of the slots 84,86, for securely tilting a chain saw 40 sideways for example. Furthermore, the rib 80 should have sufficient length for preventing the hinge plate 72 from tilting about the hinge 74 and out of the slots 84,86.

The location of both caps for the gas reservoir and the chain lubricant reservoir are normally located on the left side of the power saw engine. Therefore, when the chain saw is tilted sideways as taught herein, the filling caps are oriented upwardly as shown at 88, where they are accessible for filling without cause for spill to the ground.

It will be appreciated that although the rib 80 and the washers 34 are illustrated as being part of the workbench according to the second preferred embodiment, these features may also be incorporated in the workbench according to the first preferred embodiment depending upon the preferences of a manufacturer.

As to further instructions related to specific dimensions, to the manner of manufacturing and to the manner of using either preferred embodiments of the mini-workbench, the same should be apparent from the above description, and accordingly, no further discussion relative to these aspects are provided.

While two embodiments of the present invention have been illustrated in the accompanying drawings and described herein above, it will be appreciated by those skilled in the art that various modifications, alternate constructions and equivalents may be employed without departing from the true spirit and scope of the invention. Therefore, the above description and the illustrations should not be construed as limiting the scope of the invention which is defined by the appended claims.

I claim:

1. A workbench for supporting a power saw to a tree stump, comprising;

a first flat bar having parallel top and bottom surfaces; a second flat bar having a parallel top and bottom surface; a hinge means connected to said first and second flat bars; a planar tab extending from said second flat bar bottom surface, and three parallel straight posts fixedly mounted to a said first flat bar top surface and defining a fixed clamp gap therebetween for clamping a chain saw bar;

such that said planar tab is insertable in a slot cut in a tree stump for retaining said flat bar to said tree stump, and said three parallel straight posts are usable for retaining said chain saw bar to said flat bar.

2. The workbench as claimed in claim 1, wherein said planar tab extends substantially at right angle with said bottom surface.

3. The workbench as claimed in claim 2, wherein said flat bar has a longitudinal axis, and said planar tab extends substantially at right angle with said longitudinal axis.

4. The workbench as claimed in claim 1, wherein said planar tab has a thickness which is similar to a common chain saw kerf.

5. The workbench as claimed in claim 1, wherein each of said posts in said three parallel straight posts is a bolt having a bolt head at a distance from said top surface.

6. The workbench as claimed in claim 5, wherein each of said three parallel straight posts extends at right angle from said top surface.

7. The workbench as claimed in claim 6, wherein said three parallel straight posts define a triangular formation having an apex and a base and said fixed clamp gap is between said apex and said base.

8. The workbench as claimed in claim 7 wherein said fixed clamp gap is about ⅛ inch.

9. The workbench as claimed in claim 6 wherein each of said posts has a length of about 2¾ inches.

10. A workbench for supporting a chain saw to a tree stump, comprising:

a first flat bar having a first top surface and a first bottom surface;

a second flat bar having a second top surface and a second bottom surface;

a hinge means connected to said first and second flat bar and movably joining said first bottom surface to said second top surface for relative angular movement between said first and second flat bars;

a planar tab extending from said second bottom surface; and clamp means mounted on said first top surface for clamping a chain saw bar;

such that said planar tab is insertable in a slot cut in a tree stump for retaining said second flat bar to said tree stump, said clamp means is usable for retaining a chain saw bar to said first flat bar, and said first flat bar is angularly movable relative to said second flat bar for tilting said chain saw bar.

11. The workbench as claimed in claim 10, wherein said hinge means comprises rotation stopper means for limiting a tilting of said chain saw bar.

12. The workbench as claimed in claim 11, wherein said rotation stopper means has a rotational range of less than 90 degrees.

13. The workbench as claimed in claim 10, wherein said planar tab extends substantially at right angle with said second bottom surface.

14. The workbench as claimed in claim 13, wherein said first flat bar has a longitudinal axis, and said planar tab extends substantially at right angle with said longitudinal axis.

15. The workbench as claimed in claim 14, further comprising a planar rib connected to said planar tab and extending substantially at right angle from both said planar tab and said second bottom surface.

16. The workbench as claimed in claim 15 wherein said planar tab has a first thickness and said planar rib has a second thickness, and said first and second thicknesses are similar to a common chain saw kerf.

17. In combination, a workbench and a chain saw mounted to said workbench for being steadied by said workbench and serviced; said chain saw having a saw bar and said workbench comprising;

a flat bar having parallel top and bottom surfaces, means for steadying said flat bar to a fixed object hingedly mounted to said bottom surface, and three parallel straight posts fixedly mounted to said top surface and defining a fixed clamp gap therebetween; said saw bar being interlaced between said three parallel straight posts in said fixed clamp gap;

such that flat bar is retainable to a fixed object and said chain saw is retainable to said flat bar for being serviced.

18. The combination as claimed in claim 17, wherein each of said three parallel straight posts is a bolt having a stem and a bolt head, and a diameter of said bolt head is larger than a cross-section of said stem.

19. The combination as claimed in claim 18, wherein each of said bolts has a length of about 2¾ inches and each of said three parallel straight posts has a round washer mounted thereon at an intermediate position between said bolt head and said top surface of said flat bar.

20. The combination as claimed in claim 19, wherein said means for steadying said flat bar to a fixed object comprises a planar tab extending at right angle from said bottom surface, and said planar tab has a thickness similar to a chain saw kerf.

* * * * *